SEYMOUR SASLOW
J. PETER KNAUTH
INVENTORS

BY George B. Oujevolk

ATTORNEY

United States Patent Office 3,196,940
Patented July 27, 1965

3,196,940
COOLING OF SEALED ENCLOSURE
Seymour Saslow, Saratoga Springs, and Johannes Peter Knauth, Hurley, N.Y., assignors to Espey Mfg. & Electronics Corp., Saratoga Springs, N.Y., a corporation of New York
Filed Sept. 3, 1963, Ser. No. 305,953
5 Claims. (Cl. 165—108)

The present invention relates to bottled-up motors and more particularly to an arrangement of bottled-up motor and impeller to enhance air convection inside an enclosure for cooling purposes.

In the normal cooling of equipment within an enclosure, there is an impeller with an input duct at one end and an air outlet at the other end. Air is sucked into the enclosure by the impeller and then passes through the enclosure and out the other end. When equipment such as electronic components is located in a sealed enclosure and has to be cooled, it is advantageous to mount the equipment requiring cooling such as transistors, tubes, etc. on one wall and use the wall as a heat exchanger, cooling the wall. Certain types of sealed enclosures containing electronic equipment can only occupy a very limited space such as in aircraft, submarines, armored vehicles, etc. Considerable juggling around of components is therefore required so as to provide cool air to the heat exchanger wall. To properly circulate the cool air along the outside of the heat exchanger wall, a double wall arrangement may be used with an input zone at one end. The double wall forms a passage for the air, one of the double walls being of course the heat exchanger wall, the other wall acting as a guide wall for the cool air. An impeller is required in the input zone to circulate the air in the space defined by the double wall arrangement. In addition to the impeller, a motor is required to drive the impeller. Logic dictates that the motor should be on the outside of the enclosure since the motor itself generates considerable heat, and, having the motor on the outside would facilitate repairs thereto.

There is at present in existence for military use, e.g., in some small compact vehicles, missiles, submarines, etc., many units of the type just described, with many more units in daily production where the motor is located on the inside of the enclosure. In the existing equipment, a conventional type motor with a rotor inside of the stator windings and bearings on the endbells outside of the length of the rotor is used. Since this equipment may be submerged in water, to prevent outside liquid from entering the enclosure via the motor, shaft and bearings, the whole motor is sealed in the container so that any liquid which enters via the shaft merely fills the cooling passage. But, bottled-up in this manner, the motor runs abnormally hot and often burns out. It is necessary therefore to provide a known, tested and proven motor for this particular application with as little electrical change as possible. Furthermore, the motor has to be part of a retrofit arrangement with almost no change to the existing equipment which is covered by extensive military specfications as to performance and especially as to the sealing of the equipment against penetration by ambient fluids such as water. Generally speaking, two types of motors must be considered.

First to be considered are conventional motors of the squirrel-cage induction type, constructed with the squirrel-cage winding of a smaller diameter than the stator winding so as to rotate within the stationary stator winding. This is reasonable since the conventional use of these motors is to have the rotor turn a concentric shaft which is coupled with an external load at one end or the other, or at both ends of the motor. Usually the shaft and rotor are supported by bearings contained within the endbells of the stator housing with the shaft extending thru the bearing and beyond the end-bells.

Second, there is the "inside-out" motor having the rotor winding of larger diameters than the stator winding and rotates outside and around the stationary stator winding. Electrically, either construction presents quite similar design problems; practically, the advantages of one become the limitations of the other.

When a motor is to be used to drive fan blades it is sometimes advantageous to use the "inside-out" motor construction so that the fan blades may be attached directly to the external squirrel-cage rotating member. The space at and near the center of the fan blades contributes little to the movement of air so that the motor may be fitted into the hub of the fan and contained within the thickness of the fan blades without adding unnecessarily to the overall depth of the fan as would a motor with the fan blades attached to an extended shaft on one end of the motor. In such a design with the "inside-out" motor in the hub of the fan blades, the motor's stator is wound concentric to the axis of a central cylindrical tube, flanged at one end to form a stationary mounting for the stator. The tube becomes a support for the rotor bearing at the inside of each end of the tube. The squirrel-cage winding is cast in the form of a cylinder with one end open and the other closed. The closed end supports a concentric shaft which, at time of assembly when the squirrel-cage is slipped over the stator, is passed thru the bearings and held in place with a locking washer at the support-end of the stator tube.

However with only a narrow passage defined by the double wall construction the inside-out motor with blades mounted thereon cannot be used as an impeller. Nor can the usual inside out motor arrangement with fan blades thereon be used within the equipment because the gas in the equipment increases the load on the blades tremendously adding to the motor heat in an already over heated area. This therefore leaves the conventional mtoor. But the conventional motor likewise increases the heat within the enclosure so that within a short time the motor burns out. Although attempts may have been made to provide a heat exchanger arrangement to cool an enclosed area with the motor inside the enclosure, none as far as we are aware has ever been successful when carried out into practice.

It has now been discovered that an inside out motor can be provided bottled-up within a sealed enclosure for use with an external impeller in a heat exchanger arrangement.

Thus, it is an object of the present invention to drive an external load with a motor located within an enclosure.

Another object of the present invention is to provide a sealed driving arrangement.

Still another object of the present invention is to provide a heat exchanger arrangement for a sealed enclosure whereby the cool outside gases are circulated along a heat exchanger wall. The hot gases within the enclosure remote from the wall are brought to the wall for cooling while the now cooled gases within the enclosure along the wall are driven toward the inside of the enclosure to cool the equipment therein.

With the foregoing and other objects in view, the invention resides in the novel arrangement and combination of components and in the details of construction hereinafter described, it being understood that changes in the precise embodiment of the invention herein disclosed may be made within the scope of what is described without departing from the spirit of the invention.

The invention broadly contemplates an arrangement whereby a squirrel-cage impeller rotates on one side of the heat exchanger wall and the cylindrical squirrel cage rotor of the motor rotates on the side of the wall inside the equipment enclosure. The heated air inside the enclosure finds its way by convection to the wall surface for cooling, the motor within the enclosure acting to stir up the air in its vicinity and enhance the effectiveness of the cooling process.

The advantages of the invention will become apparent from the following description taken in conjunction with the accompanying drawing in which:

FIGURE 1a is a front view of the arrangement shown in FIGURE 1 along the lines 1a—1a thereof;

Figure 1:
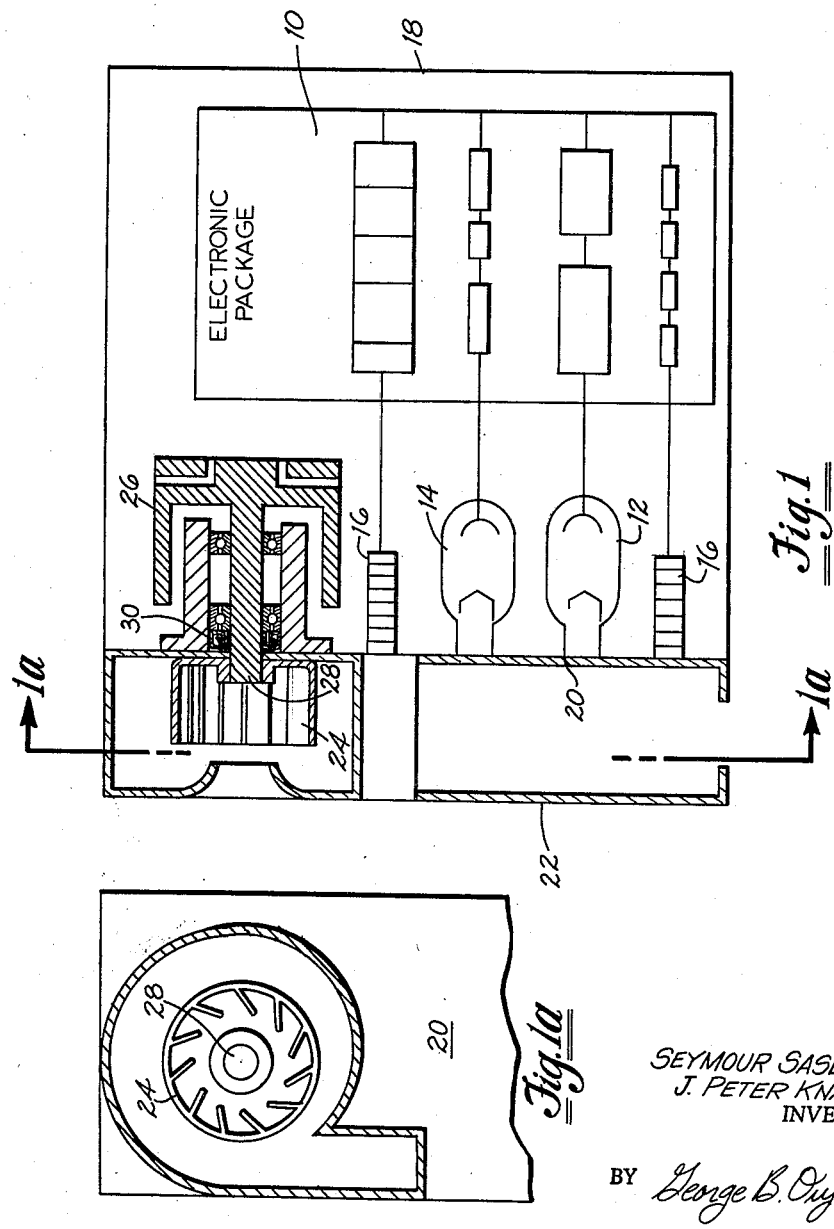
FIGURE 1 shows a piece of electronic equipment within a sealed enclosure with the heat exchanger arrangement herein contemplated.

Before going into details of the invention, it is necessary to first view the problem presented. A motor must be mounted within an enclosure in a retro-fit arrangement because there is no space to put the motor on the outside of the enclosure. This has to be done with no changes to existing equipment. The problem is further complicated by the fact that in the existing equipment, a squirrel-cage impeller must be on the outside of the heat exchanger wall, recessed in a housing for this purpose, with air entering the squirrel-cage axially through a hole in the outer wall of the heat exchanger plate and discharging tangentially so as to flow over the heat exchanger wall. Hence, the motor must be on the other side of the heat exchanger wall to drive the squirrel-cage impeller. This shaft opening must be sealed against liquid entering from the impeller side.

In general, use is made of a known inside-out motor of the type which has an internal shaft supported on two bearings which are inside the bore of the stator and within the length of the stator. The shaft is extended in a direction opposite the flange of the rotor and a seal mounted where the shaft passes through the stator flange. The fan blades which formed a part of the rotor casting were milled off so that the blades would not stir up air unnecessarily and most inefficiently within the enclosure. Also, the blades constitute a safety hazard when servicing the equipment. The smooth cylinder rotor exhibits sufficient drag to stir up air which surrounds it. This stirring up of air is advantageous in two ways: It cools the rotor member and in so doing assists in cooling the stator. It stirs up gas in the vicinity of the motor which enhances the effectiveness of getting enclosure gas in contact with the heat exchanger wall. Furthermore, such an inside-out motor has its bearings contained within the stator and allows a much shorter motor axially than a design with outboard bearings. Furthermore, properly disposed cooling apertures can be disposed in the rotor. Therefore, the contemplated objective is accomplished by using a stationary member including a field winding bearings supported by the stationary member; and, a rotating member including a shaft portion extending beyond and through said stationary member and said bearings and then doubling back on the shaft portion on the outer side of the stationary member including a field winding on said doubling back part of the rotating member. With this construction the bearings are on the inside and not on the outside of the motor.

In the practical embodiment shown in the drawing, there is shown some electronic equipment 10 including tubes 12 and 14, resistors 16 etc. in an enclosed package 18. The components requiring the most cooling e.g., tubes 12, 14, resistors 16, are mounted on one wall 20 of the enclosure which serves as the heat exchanger wall. A second wall 22 will act as a gas guide to guide cool gases along the heat exchanger wall 20. The outside gases are circulated along the wall by means of an impeller 24 driven by a motor 26 inside the enclosure. The impeller 24 is coupled to the motor 26 by means of a shaft 28 passing through a seal arrangement 30.

It is the combined construction and disposition of motor 26, shaft 28 and seal arrangement with which the present invention is principally concerned. Since as heretofore explained neither a conventional motor nor the usual inside-out motor with fan blades thereon can be used for very long without the motor being seriously overheated.

Figure 2:
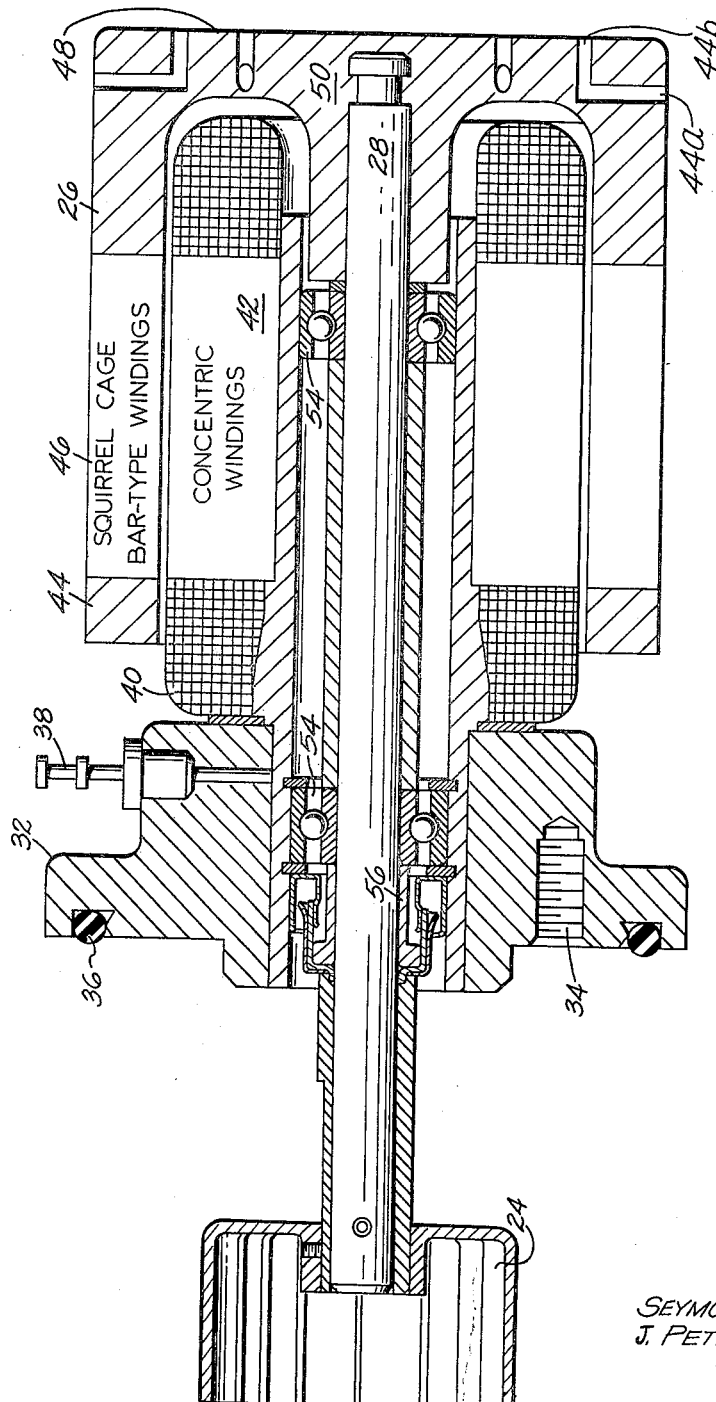
FIGURE 2 is a longitudinal cross sectional view of the motor-impeller arrangement illustrated in FIGURE 1.
Figure 3:
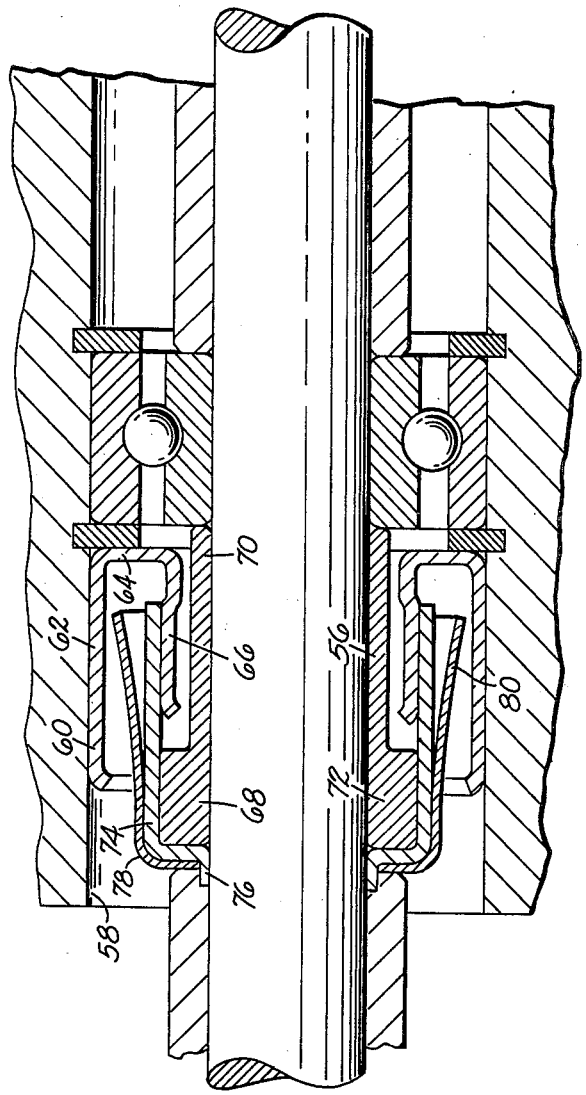
FIGURE 3 depicts a static seal used in the motor-impeller arrangement shown in FIGURE 2.

In the view shown in FIGURE 2, the heat exchanger wall has been omitted for convenience of illustration since the wall itself plays no great part in the explanation of the device and the principles involved are shown in FIGURE 1.

The motor 26 is of the inside-out type and includes a mounting hub 32 and in construction will have a plurality of longitudinally disposed blind holes 34, useful in mounting the hub on the wall. A tight seal is maintained between the hub and the wall by means of an O-ring 36, and the hub will include the electrical connections 38. Affixed to hub 32 is the cylindrical stator casting 40 having windings 42 concentric to the cylindrical axis.

Mounted over the stator is the squirrel cage rotor 44 and rotor winding 46 in the form of a cast cup-shaped cylinder with aluminum bars so as to provide for the electrical and magnetic paths. The closed end 48 of the cast cup-shaped rotor section extends beyond the stator, and includes a center boss 50 rotating inside the stator. The drive shaft 28 is mounted axially in the center boss 50, and held for rotation by bearings 54 between the stator and shaft. The shaft passes out of the heat exchanger wall 20 through a seal 56 which will again be referred to at a later point in this specification. Mounted on the shaft outside of the enclosure is the impeller 24 which is shown better in FIGURES 1 and 1a.

Now as heretofore pointed out, the usual inside-out motor would have blades mounted on the rotor and shaft 28 would dead end at the wall. But this arrangement simply heats up the motor. Even with a cylindrical stator housing around the fan blades the motor would be heated to a high temperature.

In the present invention, for the motor to run without overheating, it is essential that there be a minimal load on the rotor. The outer part of the rotor must be milled smoothly so as to create a minimal load during rotation. Surprisingly enough, the rotating rotor cylinder will stir the gases in its vicinity and enhance the heat exchanger cooling operations sufficiently to enable the motor to run without danger at substantially higher temperatures than the conventional motor or the inside out motor with blades thereon. Cooling is further enhanced by providing axial and radial apertures 44a and 44b in the rotor, as shown in FIGURE 2.

However, in some operations, it is essential that an absolute seal be maintained particularly during static conditions where the equipment is not in operation. This is particularly true of equipment in textile plants, equipment which is sometimes submerged underwater, etc. The seal 56 shown in the drawing forms part of the co-pending patent application entitled "Sealing Means" filed July 23, 1963, Serial No. 297,106 by Johannes Peter Knauth one of the co-inventors herein.

This sealing means is designed to form a seal between the inner wall 58 of the stator 40 and shaft 28 and generally includes a cylindrical collar 60 with a cylindrical outer collar wall 62 mounted on the stator inner wal 58, a radial wall 64 and a cylindrical inner collar wall 66 substantially concentrical with said outer collar wall 62 and separated therefrom by said radial wall 64; a boss 68 mounted on said rotor shaft 28 with a thin section 70 extending towards the radial wall 64 and a stub section 72 towards the open end of the collar 60; a resilient cup 74 disposed around the stub section 72, the cylindrical portion thereof resting on the outer face of the inner cylindrical collar wall 66 including a neck 76 sealed to the shaft 28; and a solid cup 78 fitted with an outwardly flanged portion 80, fitted over the resilient cup 74, whereby at rest the resilient cup grips the inner cylindrical collar wall 66 but during rotation will be driven outward away from said wall by centrifugal force.

It is to be observed therefore that the present invention provides for a motor useful in a heat exchanger system wherein equipment in a substantially sealed enclosure located in a confined area is to be cooled by cooling one wall of the enclosure acting as a heat exchanger, bringing gases within the enclosure to said wall where said gases are cooled and then circulating the cooled gases within the enclosure, and comprises in combination, a hollow motor stator mounted within said enclosure on said wall around a small aperture therein, including concentric windings and a mounting hub; impeller means on the outer side of said wall opposite said stator mounting hub; a drive shaft connected to said impeller journaled in said small aperture in the wall, passing axially through the stator; and, a cup shaped squirrel cage rotor around said stator with a radial end wall coupled at its center to said drive shaft, the outer surface of said rotor being smooth. The enclosure may be maintained in sealed condition during static conditions by providing a seal between the stator and the shaft which seal includes a collar with the outer collar wall mounted on the stator inner wall, and an inner collar wall separated from the outer collar wall. A resilient cup mounted on the drive shaft disposed so that the cylindrical cup wall rests on the outer side of the inner collar wall, and a solid cup with an outwardly flanged portion likewise mounted on the drive shaft fitted over the resilient cup for support when the resilient cup is driven outward by centrifugal action during rotation of the shaft.

Furthermore, it is to be observed that the present invention provides for a device wherein a shaft portion of a rotating member runs through a stationary member which supports bearings therein, the rotating member then doubling back on the shaft portion on the outer side of the stationary member. Also, the present invention provides for a retro-fit arrangement wherein a motor used with an impeller will require substantially less room behind the impeller than conventional designs and still comply with existing military specifications which require sealing against static pressure and also spell out the ratio of overhang to space between bearings for a given shaft diameter. The present invention combines the inherent shortness of an inside-out motor, its ability to self-cool its own rotor, the rigidity furnished by the static bearing cartridge in addition to being effectively shorter because of the encloced bearings.

Although the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention and appended claims.

We claim:

1. In a heat exchanger system wherein equipment in a substantially sealed enclosure located in a confined area is to be cooled by cooling one wall of the enclosure, in combination,
   a wall to act as a heat exchanger;
   a hollow cylindrical stator mounted within said enclosure on said wall around a small aperture therein;
   impeller means on the outer side of said wall opposite said stator,
   a drive shaft connected to said impeller means journaled in said stator cylinder passing through said small aperture in the wall and,
   means for bringing gases within the enclosure to said wall where said gases are cooled and for circulating the cooled gases within the enclosure, said means comprising:
   a cup-shaped squirrel cage rotor around said stator with a radial end wall coupled at its center to said drive shaft, the outer surface of said rotor being smooth.

2. A device as claimed in claim 1 including a cylindrical stator inner wall in said stator around said drive shaft and static sealing means between said stator wall and said drive shaft.

3. In a heat exchanger system wherein equipment in a substantially sealed enclosure located in a confined area is to be cooled by cooling one wall of the enclosure, in combination,
   a wall to act as a heat exchanger;
   a hollow cylindrical stator including concentric windings and a mounting hub mounted within said enclosure on said wall around a small aperture therein;
   impeller means on the outer side of said wall opposite said stator mounting hub;
   a drive shaft connected to said impeller means journaled in said stator cylinder passing through said small aperture in the wall; and,
   means for bringing gases within the enclosure to said wall where said gases are cooled and for circulating the cooled gases within the enclosure, said means comprising:
   a cup-shaped squirrel cage rotor around said stator with a radial end wall coupled at its center to said drive shaft, the outer surface of said rotor being smooth.

4. A device as claimed in claim 3 including a cylindrical stator inner wall in said stator around said drive shaft and static sealing means between said stator wall and said drive shaft.

5. In a heat exchanger system wherein equipment in a substantially sealed enclosure located in a confined area is to be cooled by cooling one wall of the enclosure, in combination,
   a wall to act as a heat exchanger;
   a hollow cylindrical stator including concentric windings and a mounting hub mounted within said enclosure on said wall around a small aperture therein;
   impeller means on the outer side of said wall opposite said stator mounting hub;
   a drive shaft connected to said impeller means journaled in said stator cylinder passing through said small aperture in the wall;
   means for bringing gases within the enclosure to said wall where said gases are cooled and for circulating the cooled gases within the enclosure, said means comprising:
   a cup-shaped squirrel cage rotor around said stator with a radial end wall coupled at its center to said drive shaft, the outer surface of said rotor being smooth;
   a cylindrical stator inner wall in said stator around said drive shaft and static sealing means beetween said stator inner wall and said drive shaft, said sealing means including a collar with an outer collar wall mounted on said stator inner wall, an inner collar wall separated from said outer collar wall, a resilient cylindrical cup including an inner cup wall mounted on said drive shaft disposed so that cup wall rests on the outer side of the inner collar wall, and a solid cup with an outwardly flanged portion also mounted on said drive shaft fitted over the resilient cup so that the resilient cup is driven outward against said flanged portion by centrifugal action during rotation of the shaft.

References Cited by the Examiner

UNITED STATES PATENTS

| | | | |
|---|---|---|---|
| 765,078 | 7/04 | Jigouzo | 310—67 X |
| 1,905,597 | 4/33 | Long | 165—121 |
| 2,011,753 | 8/35 | Cornelius | 165—121 |
| 2,514,460 | 7/50 | Tucker | 310—67 |
| 2,544,183 | 3/51 | Rogers et al. | 165—108 |
| 2,654,583 | 10/53 | Treanor | 165—121 X |
| 2,722,404 | 11/55 | Koff | 165—55 X |
| 2,975,528 | 3/61 | Shewmon | 310—67 |
| 2,990,112 | 6/61 | Levy et al. | 310—67 X |
| 3,002,118 | 9/61 | Papst | 310—67 X |
| 3,032,666 | 5/62 | Papst | 310—67 |

ROBERT A. O'LEARY, *Primary Examiner.*

CHARLES SUKALO, *Examiner.*